United States Patent [19]
Berger et al.

[11] Patent Number: 6,081,499
[45] Date of Patent: Jun. 27, 2000

[54] MAGNETO-OPTICAL DATA STORAGE SYSTEM HAVING AN OPTICAL-PROCESSING FLYING HEAD

[75] Inventors: Jill D. Berger; John F. Heanue; Jerry E. Hurst, Jr., all of San Jose; John H. Jerman, Palo Alto; Jeffrey P. Wilde, Los Gatos, all of Calif.

[73] Assignee: Seagate Technology, Inc., Scotts Valley, Calif.

[21] Appl. No.: 09/191,835

[22] Filed: Nov. 13, 1998

Related U.S. Application Data

[63] Continuation-in-part of application No. 08/851,379, May 5, 1997
[60] Provisional application No. 60/022,775, Jul. 30, 1996, provisional application No. 60/023,476, Aug. 6, 1996, and provisional application No. 60/025,801, Aug. 27, 1996.

[51] Int. Cl.[7] .................................................. G11B 13/04
[52] U.S. Cl. ......................... 369/112; 369/44.19; 369/99; 369/13; 360/77.03; 360/113
[58] Field of Search ............................. 369/112, 14, 13, 369/44.14, 110, 113, 99, 44.19; 360/113, 77.03, 114, 103; 29/603.06

[56] References Cited

U.S. PATENT DOCUMENTS

| | | | |
|---|---|---|---|
| 3,737,236 | 6/1973 | Borrelli | 356/118 |
| 4,135,083 | 1/1979 | Van Alem et al. | 250/201 |
| 4,581,529 | 4/1986 | Gordon | 250/227 |
| 4,633,450 | 12/1986 | Gueugnon | 369/13 |

(List continued on next page.)

FOREIGN PATENT DOCUMENTS

| | | |
|---|---|---|
| 331331 | 9/1989 | European Pat. Off. . |
| 650133 | 4/1995 | European Pat. Off. . |
| 712121 | 5/1996 | European Pat. Off. . |
| 59-117180 | 6/1984 | Japan . |
| WO 95/13638 | 5/1995 | WIPO . |
| WO 98/06095 | 2/1998 | WIPO . |
| WO 98/07060 | 2/1998 | WIPO . |

OTHER PUBLICATIONS

M. J. Daneman, et al., *Laser–to–Fiber Coupling Module Using a Micromachined Alignment Mirror*, IEEE Photonics Technology Letters, vol. 8, No. 3, Mar. 1996.
D. L. Dickensheets and G. S. Kino, *Micromachined Scanning Confocal Optical Microscope*, Optics Letters, vol. 21, No. 10, May 15, 1996.
S. Linder, et al., Photolithography in Anisotropically Etched Grooves, Optics Letters, vol. 21, No. 10, May 15, 1996.
Frank S. Barnes, et al., *Use to Optical Fiber Heads for Optical Disks*, Applied Optics, vol. 25, No. 22, Nov. 15, 1986.

*Primary Examiner*—Tan Dinh
*Assistant Examiner*—Kim-Kwok Chu
*Attorney, Agent, or Firm*—Edward P. Heller, III; Raghunath S. Minisandram

[57] ABSTRACT

A magneto-optical (MO) data storage system has a flying optical head supported over a MO storage medium, the flying head having channels or grooves formed therein and optical elements disposed within the grooves for directing an incident light beam to the storage medium and for receiving a reflected light beam from the storage medium. The flying head may comprise a two-piece assembly comprising a slider body which flies over the surface of the storage medium, and a separate optics mounting block formed to receive the optical elements and to be supported on the flying head. Preferably, the slider body is L-shaped and provides an angled surface for receiving a micro-machined mirror aligned with optical elements on the optics mounting block and controllable for deflecting the light beam to and from the storage medium.

20 Claims, 9 Drawing Sheets

U.S. PATENT DOCUMENTS

| | | | |
|---|---|---|---|
| 4,683,421 | 7/1987 | Miller et al. | 324/96 |
| 4,740,951 | 4/1988 | Lizet et al. | 370/3 |
| 4,771,415 | 9/1988 | Taki | 369/112 |
| 4,796,226 | 1/1989 | Valette | 365/122 |
| 4,799,210 | 1/1989 | Wilson et al. | 369/110 |
| 4,866,372 | 9/1989 | Aoshima et al. | 324/96 |
| 4,945,400 | 7/1990 | Blonder et al. | 372/36 |
| 5,033,043 | 7/1991 | Hayakawa | 369/121 |
| 5,105,408 | 4/1992 | Lee et al. | 369/44.15 |
| 5,119,361 | 6/1992 | Tanabe | 369/121 |
| 5,120,953 | 6/1992 | Harris | 250/227.2 |
| 5,124,961 | 6/1992 | Yamaguchi et al. | 369/13 |
| 5,152,597 | 10/1992 | Barnard | 369/110 |
| 5,197,050 | 3/1993 | Murakami et al. | 369/13 |
| 5,199,090 | 3/1993 | Bell | 385/33 |
| 5,218,582 | 6/1993 | Marchant | 369/14 |
| 5,245,491 | 9/1993 | Horie et al. | 369/13 |
| 5,351,229 | 9/1994 | Brezoczky et al. | 369/99 |
| 5,491,680 | 2/1996 | Pauli | 369/112 |
| 5,521,999 | 5/1996 | Chuang et al. | 385/88 |
| 5,536,926 | 7/1996 | Ikeda et al. | 359/224 |
| 5,625,483 | 4/1997 | Swartz | 359/224 |
| 5,737,302 | 4/1998 | Kasahara | 369/118 |
| 5,740,150 | 4/1998 | Uchimaru et al. | 369/119 |
| 5,742,419 | 4/1998 | Dickensheets et al. | 359/201 |
| 5,758,406 | 6/1998 | Hunsaker et al. | 29/603.06 |
| 5,850,375 | 12/1998 | Wilde et al. | 369/14 |
| 5,889,641 | 3/1999 | Belser et al. | 369/113 |
| 5,903,525 | 5/1999 | McDaniel et al. | 369/13 |

MAGNETO-OPTICAL DATA STORAGE SYSTEM HAVING AN OPTICAL-PROCESSING FLYING HEAD

CROSS REFERENCE TO RELATED APPLICATIONS

This application is a continuation-in-part of application Ser. No. 08/851,379 entitled "Data Storage System Having an Optical Processing Flying Head," filed on May 5, 1997. The '379 application claims priority from provisional application Ser. No. 60/022,775 entitled "A Data Storage and Retrieval System Based on a Flying Magneto-Optical Head," filed on Jul. 30, 1996; provisional application Ser. No. 60/023,476 entitled "A Data Storage and Retrieval System Based on a Flying Magneto-Optical Head," filed on Aug. 6, 1996; and provisional application Ser. No. 60/025,801 entitled "A Data Storage and Retrieval System Based on a Flying Magneto-Optical Head," filed on Aug. 27, 1996. This application is related to application Ser. No. 08/844,207 entitled "Data Storage System Having an Improved Surface Micro-Machined Mirror Assembly," filed on Apr. 18, 1997, and application Ser. No. 08/844,208 entitled "Maximum Data Storage for Magneto Optical System," filed on Apr. 18, 1997. These related applications are commonly assigned and their subject matter is incorporated herein by reference.

BACKGROUND OF THE INVENTION

The present invention relates generally to magneto-optical data storage systems and, more particularly, to magneto-optical data storage systems having optical components positioned directly on the read/write heads.

Magneto-optical (MO) data storage systems provide storage of data on a rotating disk onto which a magneto-optical recording material has been deposited. The data is stored in the magneto-optical material as spatial variations of magnetic domains. During readout, the pattern of magnetic domains modulates the polarization of an incident laser beam, and a detection system converts the resulting optical signal into an electrical signal.

In one particular magneto-optical storage system, a magneto-optical head is positioned on a linear actuator that moves the head linearly along a radial direction of the disk. A magnetic coil creates a magnetic field having one of its components oriented in a direction perpendicular to the disk surface to produce a "vertical" magnetization vector in the disk. The vertical magnetization vector is recorded in the magneto-optical material by focusing a laser beam at a spot on the disk and heating the material above its Curie point. This is the temperature at which the magnetization in the material may be readily altered by an applied magnetic field. A current is then passed through the magnetic coil to orient the vertical magnetization vector in the material in either an up or a down direction to signify either a binary one or a binary zero bit value. The orientation of the magnetization vector remains after the laser beam is removed and the material cools. After a bit is recorded, it can be erased or overwritten by reheating the same spot above its Curie point and applying a magnetic field in the opposite direction.

The data recorded on the magneto-optical disk is retrieved using the magnetic Kerr effect. This is a phenomenon in which the magnetization of a spot on the disk causes a small rotation of the polarization of a laser beam incident that is on the spot. The magnitude of this Kerr rotation is determined by the material's Kerr coefficient, while the direction or sense of the rotation, whether clockwise or counterclockwise, depends on the direction of the vertical magnetization vector of the spot. The direction of the rotation is measured by a differential detection scheme.

One major advantage of magneto-optical data storage systems is the higher real storage densities of these storage systems compared to magnetic data storage systems. However, the volumetric storage capacities of magneto-optical data storage systems have not kept pace with the volumetric storage capacities of magnetic data storage systems. One major factor limiting the volumetric storage capacity of an MO disk drive has been the relatively large size of the read/write head, which limits the spacing that can be achieved between the magneto-optical disks in a disk stack. The large size and mass of the head also limit tracking bandwidth, track density and the speed at which information can be accessed from the MO disk.

One approach for improving the volumetric storage capacities of magneto-optical data storage systems has involved the use of flying magneto-optical heads. Flying MO heads generate lift forces through aerodynamic interactions between the flying head and the rotating magneto-optical disk in the same way as a Winchester flying head in a magnetic disk storage device. These lift forces are opposed by equal and opposite spring forces applied by the suspension, which maintains the flying head at a predetermined flying height over the disk surface. Because this flying height is much less than the height of a fixed head from the disk, the use of flying heads allows the spacing between the magneto-optical disks to be reduced.

One particular magneto-optical data storage system employing a flying magneto-optical head utilizes an RF-modulated Fabry-Perot (FP) laser source and a single optical fiber for optically coupling the laser source to the flying head. The optical fiber directs the incident laser beam to a servo controlled mirror that directs the laser beam onto the rotating disk. The mirror also directs the reflected laser beam back to the single optical fiber after it is reflected from the disk. The reflected beam contains the rotated polarization information. The fiber directs the reflected laser beam to fixed optical components located remotely from the flying head for optically processing the polarization states of the rotated polarization components of the reflected laser beam. The resulting differential intensity beams are then applied to a differential detector. This design yields a smaller and lighter flying head for improved system data density and volumetric storage capacity. It also offers mechanical simplicity at a lower cost.

This single optical fiber head design requires that the polarization states of the rotated polarization components of the reflected laser beam be preserved through the entire optical path, including the single optical fiber. Therefore, the use of a polarization maintaining (PM) optical fiber is necessary. However, the birefringent nature of a polarization maintaining (PM) optical fiber combined with certain characteristics of the RF-modulated Fabry-Perot (FP) laser diode causes some undesirable results. Birefringence is a characteristic of many optical materials in which the index of refraction (a function of the velocity of light in the medium) depends on the direction of polarization of the light propagating in the material. Birefringence causes a phase shift between orthogonally polarized waves which is proportional to the difference in the refraction indices times the path length divided by the wavelength. The RF-modulated FP laser diode produces a relatively broad-spectrum, multi-wavelength incident light beam having wavelengths that fluctuate with time (mode competition). Because of the birefringent characteristics of the optical fiber, these multiple fluctuating wavelengths cause signal components in the return beam to have polarization states that also fluctuate. These fluctuations in polarization appear as noise in the differential detector, which limits the achievable data rate for a given signal level. These optical fibers also exhibit polarization mode coupling and leakage. As a laser beam travels along the fiber, such mode coupling and leakage causes some of a parallel polarization component to appear as a perpendicular polarization component, and vice versa. This polarization leakage also appears as noise at the differential detector.

Accordingly, there has been a need for an improved flying magneto-optical head that is compact and lightweight and has reduced sensitivity to laser mode competition and polarization mode coupling/leakage. The present invention fulfills this need.

SUMMARY OF THE INVENTION

The present invention resides in a compact and lightweight flying magneto-optical head providing increased volumetric storage capacities for magneto-optical data storage systems.

In one aspect, the invention advantageously provides for a flying magneto-optical head formed in two pieces. One piece is an optics mounting block, and the second piece is a slider body which supports the optics mounting block over a magneto-optical storage medium surface.

More specifically, the optics mounting block has channels formed in the block for receiving optical components for mounting the components on the flying optical head for directing a light beam. In another aspect, the slider body is L-shaped, and has a projecting portion which projects from an edge of the slider body and from an upper surface of the slider body. The optics mounting block is supported on the upper surface of the slider body in engagement with the projecting edge portion. More specifically, the projecting edge portion may include an angled portion which is adapted to receive a steerable micromachined mirror assembly in alignment with optical components mounted on the optics mounting block.

In another aspect, the invention affords a flying optical head for use in a magneto-optical data storage system which includes a slider body supporting a plurality of optical elements over a magneto-optical storage medium. The optical elements direct an incident light beam to the MO storage medium, and receive and process a reflected light beam from the storage medium.

DETAILED DESCRIPTION OF THE PREFERRED EMBODIMENTS

Figure 1:
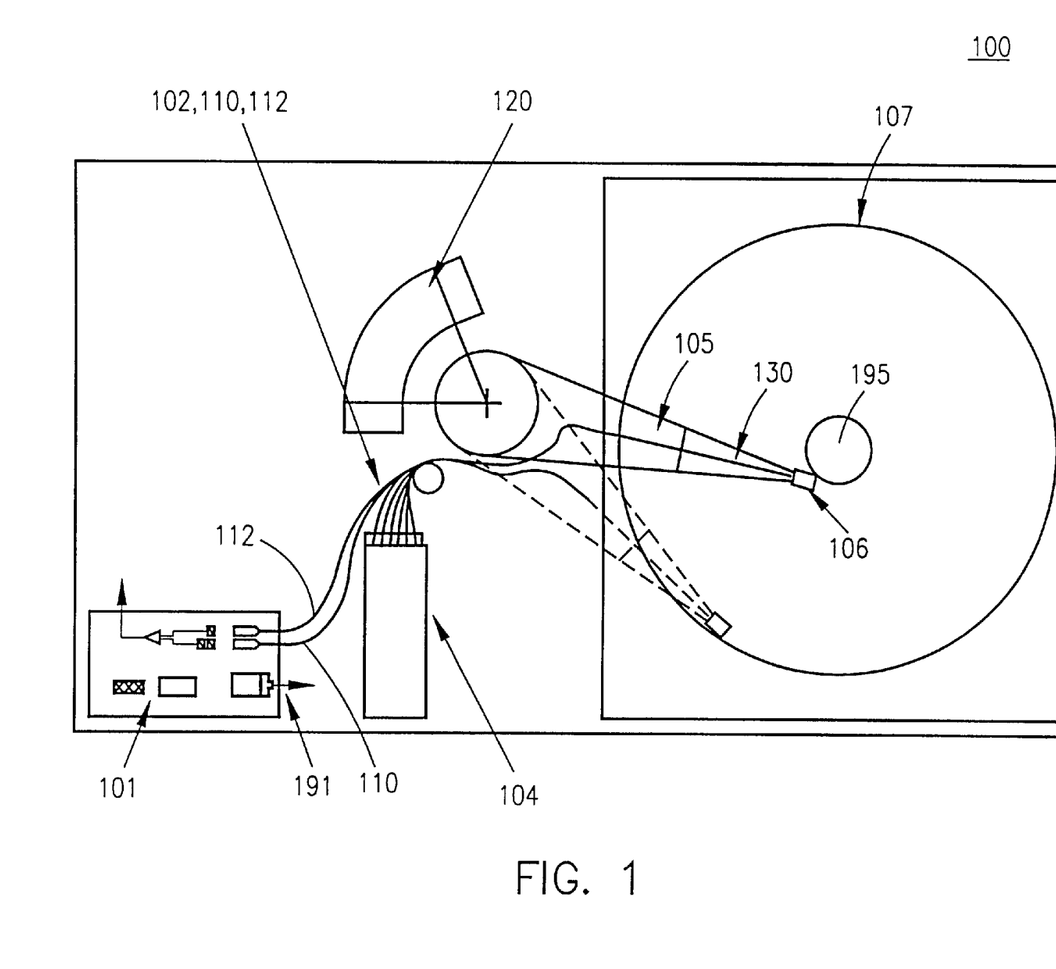
FIG. 1 illustrates a magneto-optical (MO) data storage system employing a flying MO head in accordance with the present invention.

FIG. 1 illustrates a magneto-optical (MO) data storage system 100 employing a flying MO head in accordance with the present invention. The magneto-optical (MO) data storage system 100 includes a set of Winchester-type flying magneto-optical heads 106 and a set of double-sided MO disks 107 (only one disk and one head being shown). Each flying MO head 106 is coupled to a rotary actuator magnet and coil assembly 120 by an actuator arm 105 and suspension 130, which position the head 106 over the surface of the MO disk 107. In operation, the MO disk 107 is rotated by a spindle motor 195. The rotating disk generates aerodynamic lift forces between the MO head 106 and the MO disk 107. These lift forces maintain the MO head 106 in a flying state closely adjacent to, e.g., approximately 15 micro-inches from, the surfaces of the MO disk 107. The lift forces are opposed by equal and opposite spring forces applied by the suspension 130. The MO head 106 is maintained between a minimum and maximum flying height over the surface of the MO disk 107 over a full radial stroke of the actuator arm 105, thus preventing contact between the head 106 and the MO disk 107. At rest, the MO head 106 is maintained statically in a storage condition away from the surface of the MO disk 107.

Figure 2:
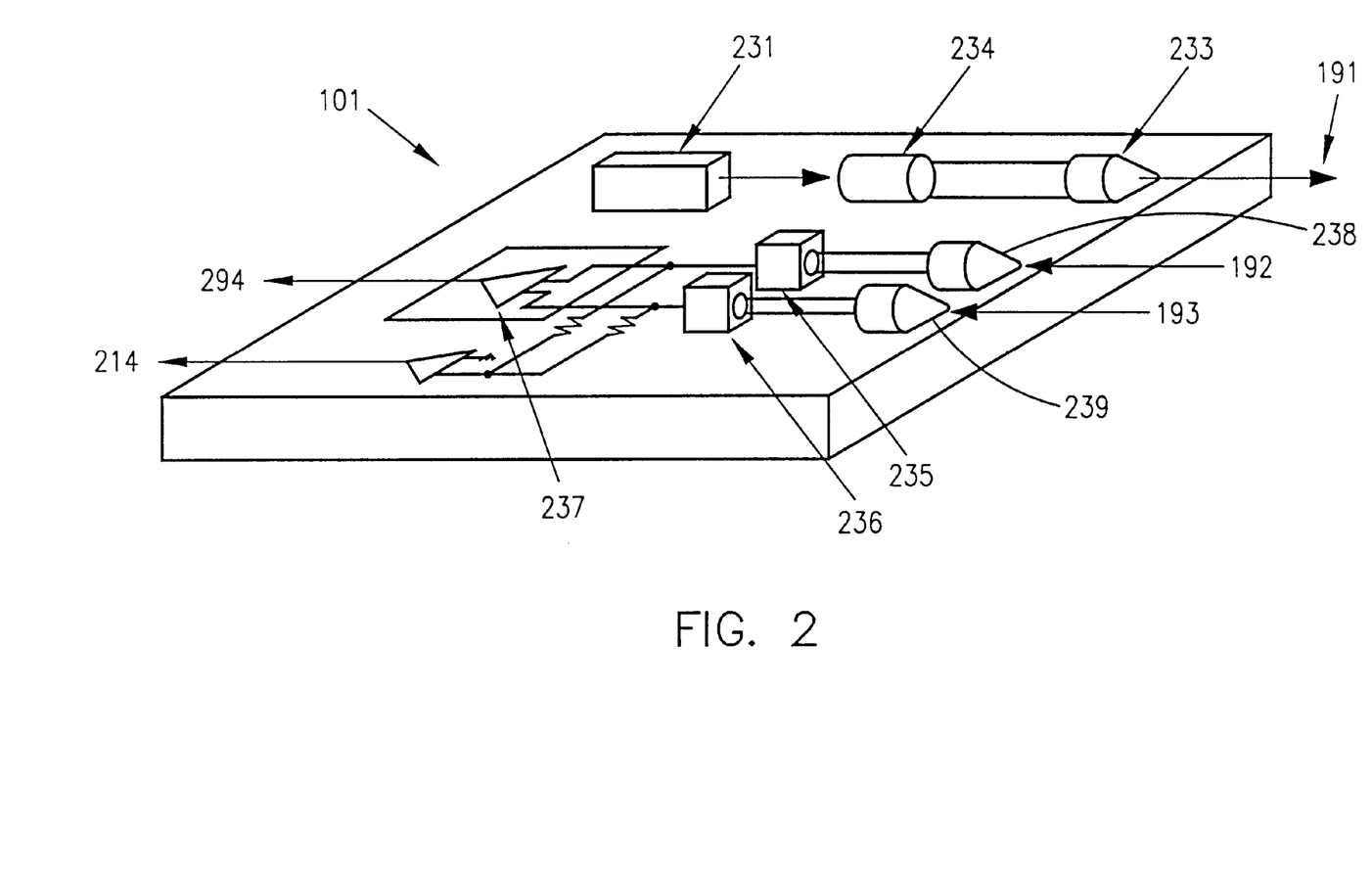
FIG. 2 is a schematic diagram of a laser optics assembly for the MO data storage system of the present invention.

The magneto-optical data storage system 100 further includes a laser optics assembly 101 optically coupled to an optical switch 104. As shown in FIGS. 1 and 2, the laser optics assembly 101 generates an incident laser beam 191, preferably linearly-polarized, as from a Fabry-Perot (FP) diode laser source 231, and receives reflected laser beam signals 192, 193 with rotated polarization information from return optical fibers 110, 112, respectively. A single-mode polarization maintaining (PM) or polarizing (PZ) optical fiber 102 (FIG. 1) optically couples the optical switch 104 to each flying head 106. The return optical fibers 110, 112 optically couple each head 106 to the laser optics assembly 101. A polarizing (PZ) fiber is preferred because it provides better suppression of the s-polarization component of the laser beam 191 compared to the polarization-maintaining (PM) fiber, thus reducing any polarization mode coupling/leakage.

The laser optics assembly 101 may further include coupling lenses 238, 239, photodiodes 235, 236, and a differential amplifier 237 for each MO head 106. The signal-intensity reflected laser beams 192, 193 are coupled through the return optical fibers 110, 112 to their respective coupling lenses 238, 239. The reflected laser beams 192, 193 are then coupled to their respective photodiodes 235, 236, which operate as an intensity-sensitive differential detector. The outputs from the photodiodes 235, 236 are connected to the inputs of the differential amplifier 237, which produces an output signal 294 representing the recorded information from the selected disk 107. The invention may employ other than the aforementioned arrangement of optical elements, as other means for directing the incident laser beam 191 and for detecting the intensity of the reflected laser beams 192, 193 are well known in the art.

Figure 3:
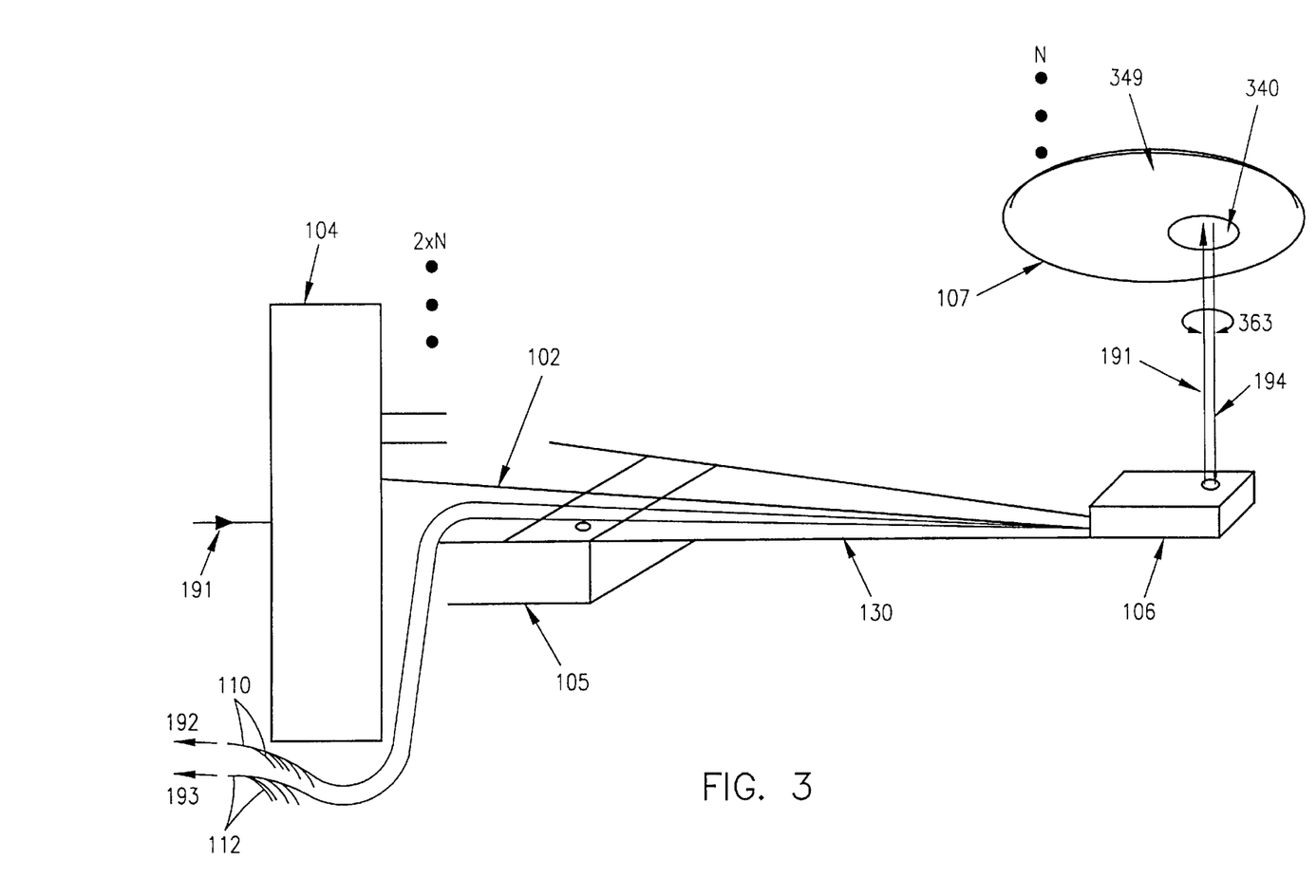
FIG. 3 illustrates an optical path between the laser optics assembly and the flying MO head of the present invention.

FIG. 3 illustrates a representative optical path between the laser optics assembly 101 and the flying MO head 106. The optical path includes the optical switch 104 and a single-mode optical fiber 102. The optical switch 104 selectively couples the incident laser beam 191 to a selected single-mode optical fiber 102. The incident laser beam 191 is directed by the single-mode optical fiber 102 to the MO head 106, where it is reflected onto a surface recording layer 349 of the MO disk 107. During recording, the incident laser beam 191 is selectively routed to an MO disk 107 and focused to an optical spot 340 on the MO recording layer 349. The incident laser beam 191 heats the area of the spot to approximately the Curie point, thus lowering its coercivity. The optical intensity of the incident laser beam 191 is preferably held constant, while a time varying vertical-bias magnetic field is used to define a pattern of "up" and "down" magnetic domains perpendicular to the surface of the MO disk 107. This technique is known as magnetic field modulation (MFM). Subsequently, as the spot 340 cools at the surface layer 349, the information is encoded at the surface of the MO disk 107.

During readout, the incident laser beam 191, which is at a lower intensity than during recording, is selectively routed to an MO disk 107 and to an optical spot 340 of interest. The Kerr effect causes a reflected laser beam 194 from the surface layer 349 to have a rotated polarization 363 of either clockwise or counter-clockwise sense, depending on the magnetic domain polarity of the spot 340. Optical components on the head 106 convert the polarization information recovered from the spot 340 into two separate reflected laser beams 192, 193 having differential intensity information. The reflected laser beams 192, 193 are coupled into respective return optical fibers 110, 112 and directed through the optical fibers to lenses 238, 239 and photodiodes 235, 236 for subsequent conversion into output signal 294. The incident and return optical fibers provide very low profile and low mass optical paths for accurate delivery of light beams to and from the MO disks 107.

Figure 4:
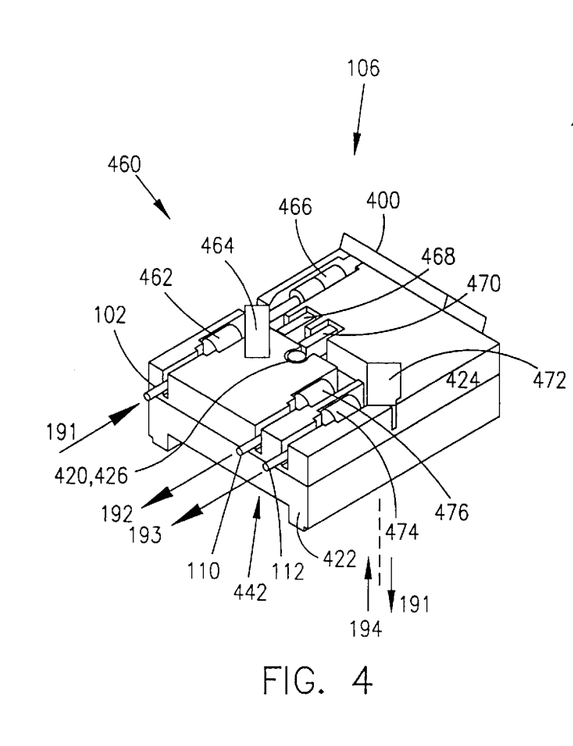
FIG. 4 is an exploded perspective view of the flying magneto-optical head in accordance with a preferred embodiment of the present invention.
Figure 5:
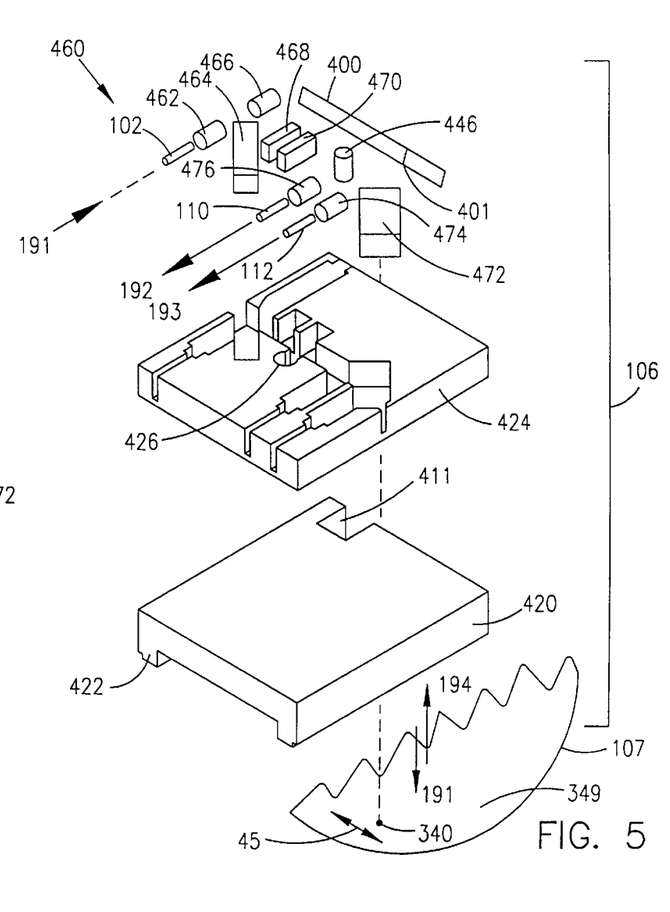
FIG. 5 is a perspective view of the flying MO head in accordance with a preferred embodiment of the present invention.
Figure 6:
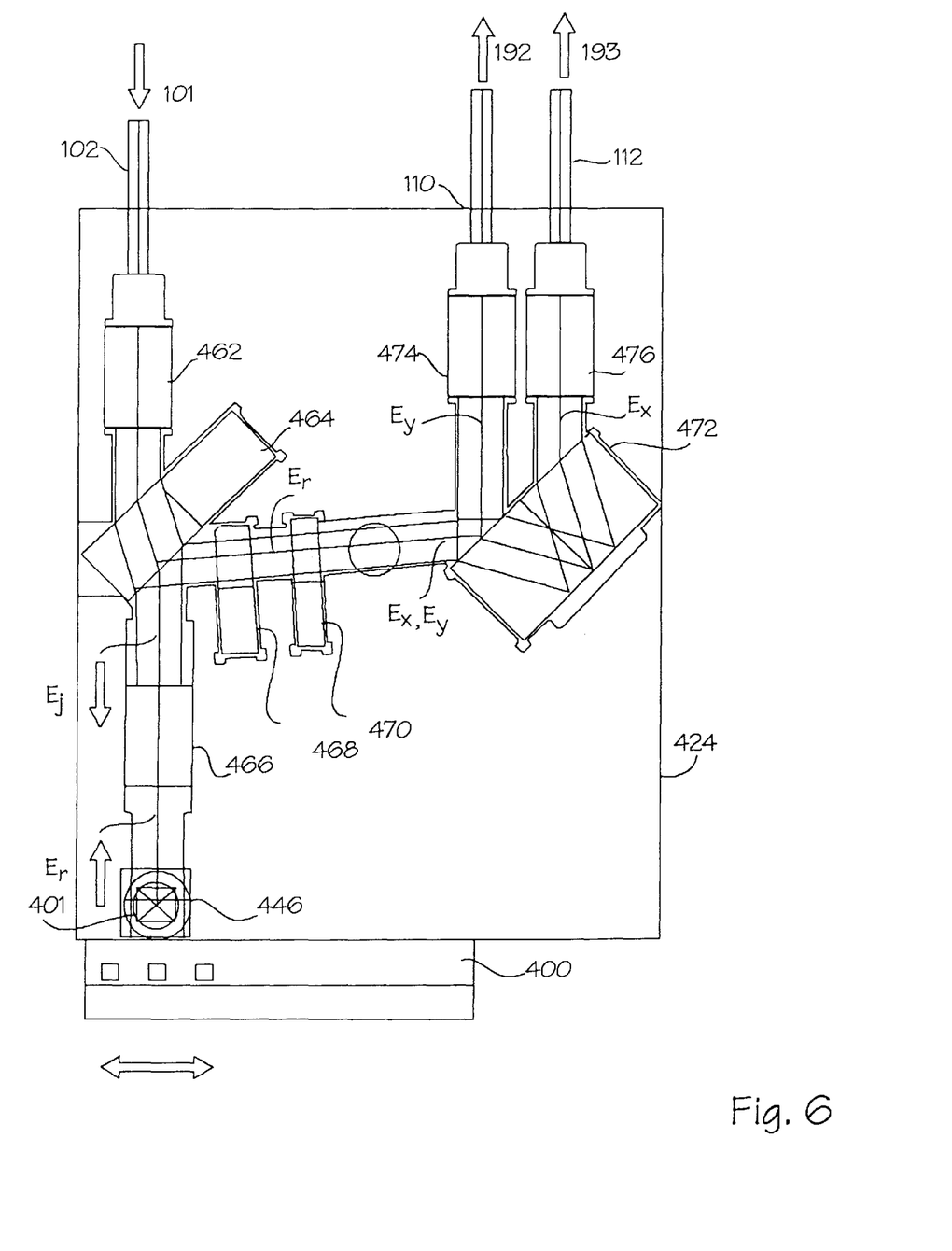
FIG. 6 is a plan view of an optics mounting block for the flying magneto-optical head of the present invention.

As shown in FIGS. 4–6, a presently preferred embodiment of the flying magnetic-optical head 106 of the present invention includes a slider body 420 having an air bearing surface 422, an optics mounting block 424, a mirror substrate 400, a set of optical elements 460, a suspension gimbal attachment 426 and a magnetic coil and yoke (not shown). The mirror substrate 400 carries a reflecting element or mirror 401 that is aligned to direct the incident laser beam 191 and the reflected laser beam 194 to and from the surface of recording layer 349.

The set of optical elements 460 preferably includes a collimating lens 462, a leaky beam splitter (LBS) 464, a fiber imaging lens (FIL) 466, an objective lens 446, a birefringence compensator plate (BCP) 468, a half-wave plate 470, a polarizing beam splitter (PBS) 472, and first and second output focusing lenses (OFL) 474, 476. The collimating lens 462 is positioned on the optics mounting block 424 between the single-mode optical fiber 102 and the leaky beam splitter (LBS) 464. The lens 462, which has an optical axis coaxial with the end of the optical fiber 102, collimates the incident linearly polarized light from the fiber 102 The lens 462 and the LBS 464 are positioned to direct the collimated incident light from the collimating lens 462 onto a first surface of the LBS 464. The linearly polarized light is incident on the leaky beam splitter 464 at an incident angle f1 relative to a surface normal to the LBS 464 surface which lies in a reference plane of incidence (POI) (the plane of the drawing of FIG. 6) parallel to the recording surface 349.

The incidence angle f1 of the leaky beam splitter LBS 464 is preferably 55 degrees, although other angles may be used. The incidence angle f1 of the reflected light to the polarizing beam splitter PBS 472 relative to a surface normal of PBS 472 is also preferably 55 degrees. The 55 degree incidence angle advantageously provides a wide 20 nm spectral bandwidth, as compared to a narrow 2 nm spectral bandwidth at an incidence angle of 45 degrees. The wider spectral bandwidth accommodates larger fluctuations in laser wavelength with ambient temperature, and reduces angular alignment tolerances.

The LBS 464 includes a glass plate having multilayer coatings on both first and second surfaces. The reflectances for the component of the incident linearly polarized light (Ei) having an electric field vector parallel ($Ei_p$) to the POI are approximately zero percent (0%) at the first surface and approximately twenty percent (20%) at the second surface. Therefore, the transmission of the parallel component ($Ei_p$) is approximately 100% at the first surface and 80% at the second surface. The reflectance for the component of the incident light having an electric field vector perpendicular ($Ei_s$) to the POI is approximately 100% for both surfaces. Therefore, the transmission of the perpendicular component ($Ei_s$) is approximately 0% for both surfaces. The LBS 464 can also have multilayer coatings on just the second surface, but the coatings on the first surface are advantageous since they further suppress the perpendicular component ($Ei_s$) of the incident linearly polarized light, thus reducing polarization leakage that appears as noise at the differential detector.

Figure 7A:
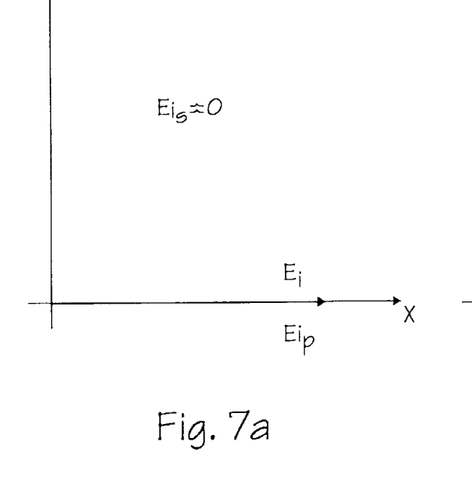
FIGS. 7A–7D depict transformation of polarization encoded optical information from the disk into differential intensity information by optical components mounted on the optics mounting block in accordance with a preferred embodiment of the present invention.
Figure 8A:
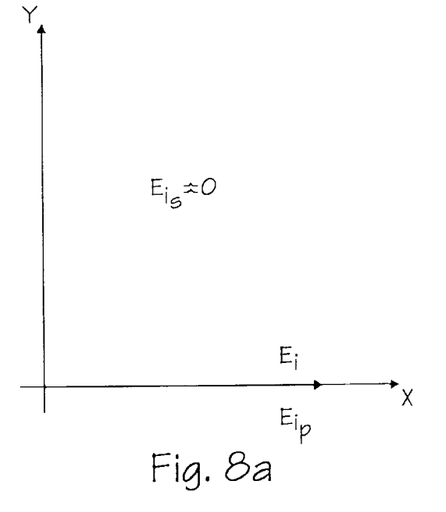
FIGS. 8A–8D depict transformation of polarization encoded optical information from the disk into differential intensity information by optical components mounted on the optics mounting block in accordance with another preferred embodiment of the present invention.

The optical fiber 102 supplies incident linearly polarized light (Ei) having a polarization that is essentially all, i.e., 100%, in the parallel direction ($Ei_p$), with little or no light, I.E., 0%, in the perpendicular direction ($Ei_s$). The LBS 464 transmits approximately 80% of the 100% parallel component ($Ei_p$) and essentially none (0%) of the 0% perpendicular component ($Ei_s$) of the incident light. This maximizes the magnitude of the potential signal that is to be reflected from the disk 107. FIGS. 7A and 8A show the components ($Ei_p$,$Ei_s$) of the incident linearly polarized light (Ei) transmitted by the LBS 464.

As shown in FIG. 6, imaging lens 466 is positioned relative to the fiber 102, lens 462, and LBS 464 so that the portion of the incident light transmitted through the LBS 464 is refracted to exit the second surface of the LBS 464 and be directed toward the imaging lens 466 along its central axis. The parallel component ($Ei_p$) is the portion of the incident linearly polarized light (Ei) that is to be acted upon by the Kerr effect at the spot 340 of interest on the recording medium of the disk. The imaging lens 466 is included in the optical path to reduce the lateral dimensions of the mirror 401. Therefore, a suitably small image of the end of the fiber 102 is projected onto the mirror 401 and through the objective lens 446 to the disk 107 as a focused optical spot.

Figure 7B:
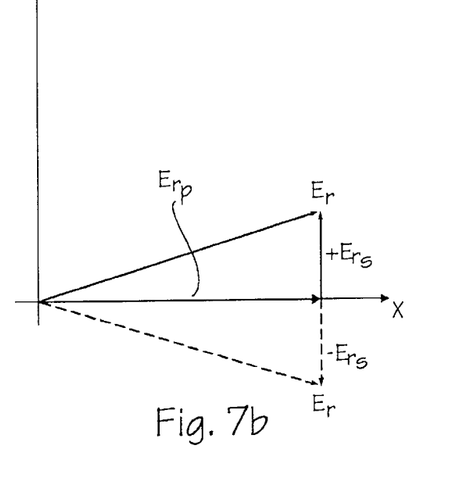
Figure 8B:
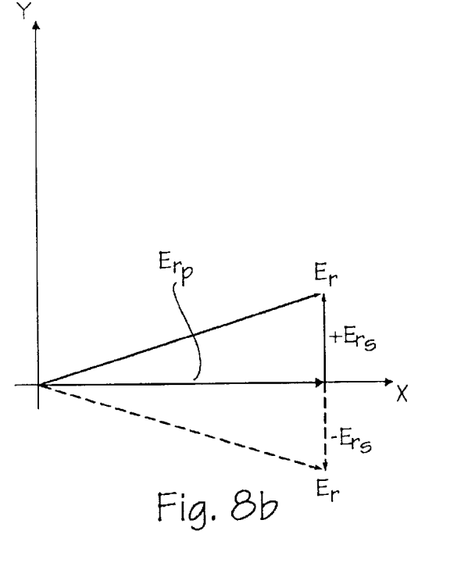

The incident linearly polarized light beam (Ei) 191 retains its parallel orientation after reflection from the mirror 401 and transmission through the objective lens 446. The incident light beam 191 is then reflected off the encoded spot 340 of interest and returned as a reflected light beam (Er) 194 carrying a reflected parallel polarization component ($Er_p$) and a reflected perpendicular polarization component ($Er_s$) with respect to the reference POI. The perpendicular component ($Er_s$) of the reflected beam corresponds to the Kerr effect polarization rotation information encoded on the disk 107, which is about +−1 degree. The reflected light beam 194 is then reflected again by the mirror 401 and is directed through the imaging lens 466 toward the second surface of the LBS 464. The reflected perpendicular component ($Er_s$) is oriented with a polarization in one direction perpendicular to the POI, for example up, or in the opposite direction perpendicular to the POI, for example down, depending on the direction of magnetization at the spot 340 of interest. FIGS. 7B and 8B show the components ($Er_p$, $Er_s$) of the reflected light beam (Er) transmitted to the imaging lens 466.

The second surface of the LBS 464 provides a reflectance of about 20% for the reflected parallel component ($Er_p$) of the reflected beam 194, or about 80% transmission, and about 100% for the reflected perpendicular component ($Er_s$). The components of the reflected light beam are directed by the second surface of the LBS 464 toward the compensating plate 468. The second surface of the LBS 464 serves to increase the magnitude of the perpendicular component ($Er_s$) of the reflected beam 194 relative to the parallel reference component ($Er_p$).

Figures 7C, 7D:
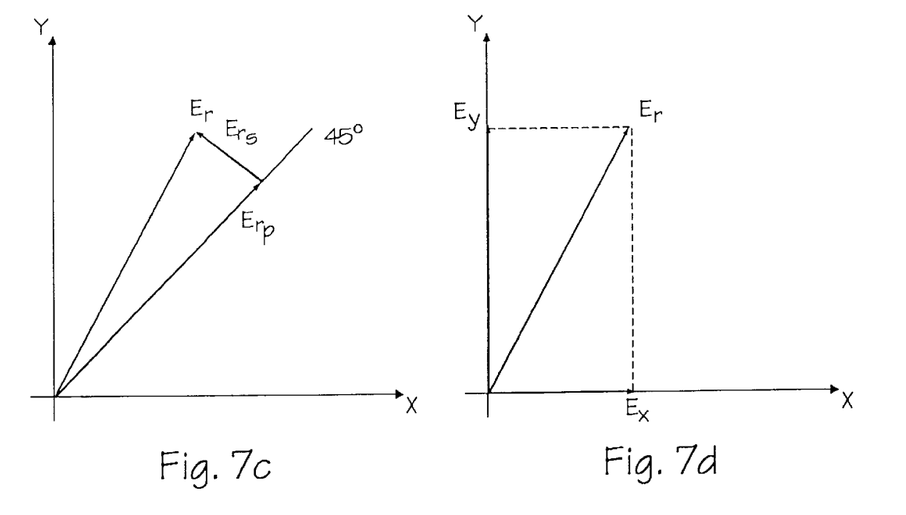

The compensator plate 468 and half-wave plate 470 are positioned to intercept and transmit the 100% perpendicular component ($Er_s$) and the 20% parallel component ($Er_p$) of the reflected light beam 194. The compensator plate 468 provides compensation for birefringent effects introduced by the mirror 401 and the second surface of the LBS 464, thereby providing retention of the relative polarization information obtained from the disk 107. The half-wave plate 470 has an optical axis aligned at about 22.5 degrees with respect to the reference POI and rotates the polarization of the reflected light beam 45 degrees, as shown in FIG. 7C. The half-wave plate 470 rotates the polarization so that the reflected light beam (Er) incident on the PBS 472 has a component polarized in the reference plane given by:

$$Ex=(1/sqrt2)(-Er_p+Er_s)$$

and a component polarized perpendicular to the reference plane given by:

$$Ey=(1/sqrt2)(Er_p+Er_s).$$

FIG. 7D shows the components (Ex, Ey) of the reflected light beam transmitted to the PBS 472.

The PBS 472 includes a polarizing first surface separated from a reflective second surface. The first surface of the PBS 472 reflects essentially all of the perpendicular polarization component (Ey) of the reflected light beam (Er) and transmits essentially all of the parallel polarization component (Ex). The first output lens 474 is aligned and positioned to receive the perpendicular component (Ey) from the first surface of the PBS 472. Optical fiber 110 is aligned and positioned with respect to the output lens 474 to receive the perpendicular component (Ey) and optically couple the reflected light beam 192 to the coupling lens 238. The parallel polarization component (Ex) of the reflected light beam (Er) is refracted a first time by the first surface of the PBS 472, reflected from the second surface of the PBS, and refracted a second time by the front surface. The second output lens 476 is aligned and positioned to receive the twice-refracted parallel component (Ex) from the second surface of the PBS 472. Optical fiber 112 is aligned and positioned with respect to the output lens 476 to receive the parallel component (Ex) and optically couple the reflected light beam 193 to the coupling lens 239.

The intensity of the light into the first output lens 474 is given by:

$$|Ey|^2=|(1/sqrt2)(Er_p+Er_s)|^2$$

and the intensity of the light into the second output lens 476 is given by:

$$|Ex|^2=|(1/sqrt2)(-Er_p+Er_s)|^2.$$

The difference signal between the two intensity signals, which is measured by the detectors 235, 236 and the differential amplifier 237, is:

$$|Ey|^2-|Ex|^2=2Er_pEr_s.$$

This difference signal provides the sign of the Kerr rotation.

Figure 8C:
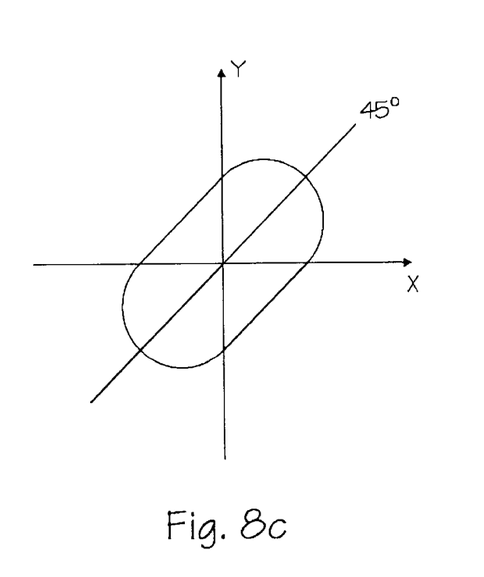
Figure 8D:
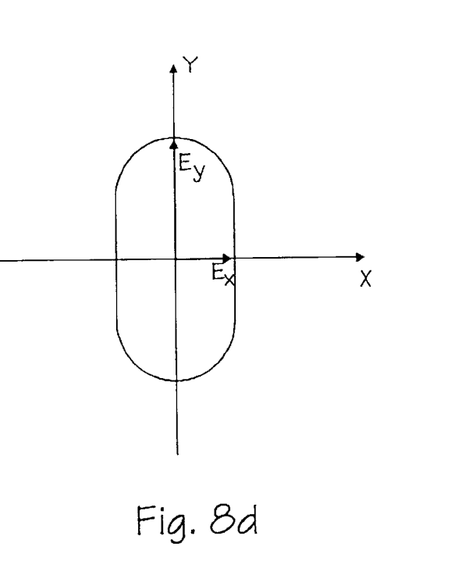

In another preferred embodiment of the flying magneto-optical head 106 of the present invention, the compensator plate 468 is replaced by a quarter-wave plate 468' (see FIG. 6). The quarter-wave plate 468' has an optical axis aligned at about 45 degrees with respect to the reference POI and generates elliptically polarized light from the reflected light beam (Er), as shown in FIG. 8C. The major axis of the ellipse is oriented at 45 degrees to the POI. The half-wave plate 470 rotates the orientation of the ellipse by 45 degrees so that one axis of the ellipse is parallel to the POI, as shown in FIG. 8D. This provides compensation for birefringent effects introduced by the mirror 401 and the second surface of the LBS 464, thereby providing retention of the relative polarization information obtained from the disk 107. The half-wave plate 470 rotates the polarization so that the reflected light beam (Er) incident on the PBS 472 has a component polarized in the reference plane given by:

$$Ex=(\tfrac{1}{2})(-Er_p+Er_s)(1+i)$$

and a component polarized perpendicular to the reference plane given by:

$$Ey=(\tfrac{1}{2})(Er_p+Er_s)(1-i).$$

The intensity of the light into the first output lens 474 is given by:

$$|Ey|^2=|(\tfrac{1}{2})(Er_p+Er_s)(1-i)|^2$$

and the intensity of the light into the second output lens 476 is given by:

$$|Ex|^2=|(\tfrac{1}{2})(-Er_p+Er_s)(1+i)|^2.$$

The difference signal between the two intensity signals, which is measured by the detectors 235, 236 and the differential amplifier 237, is:

$$|Ey|^2-|Ex|^2=2Er_pEr_s.$$

This difference signal, which is the same as in the previous embodiment, provides the sign of the Kerr rotation.

In another preferred embodiment of the flying magneto-optical head 106 of the present invention, the functions of the quarter-wave and half-wave plates 468', 470 are combined into a single optical component. In another preferred embodiment of the MO head 106, the photodiodes 235, 236 are mounted on the optics mounting block 424 with the set of optical elements 460. The return optical fibers 110, 112 are then replaced by electrical conductors.

Figure 9:
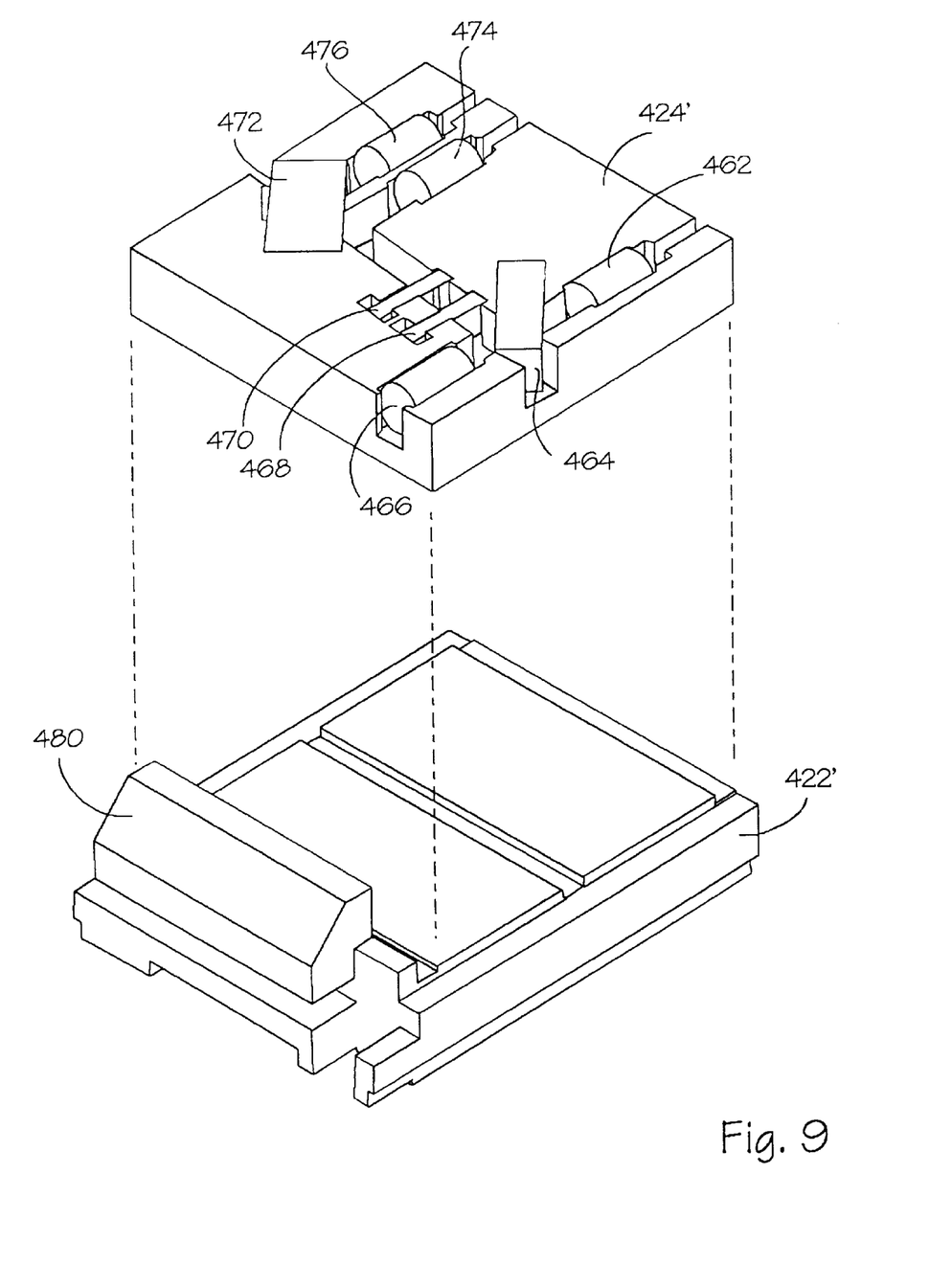
FIG. 9 is an exploded perspective view of the flying magneto-optical head employing an L-shaped slider body.
Figure 10:
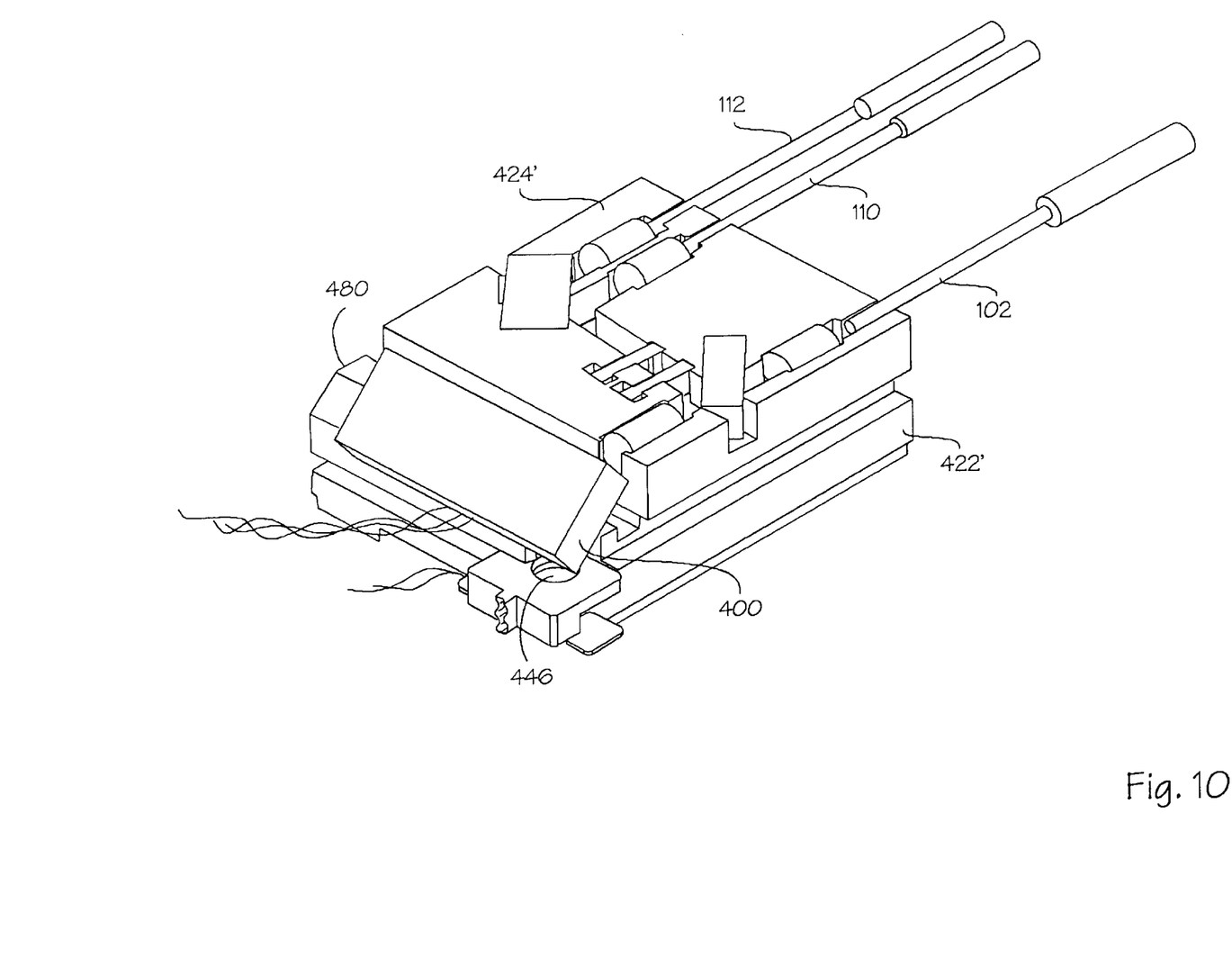
FIG. 10 is a perspective view of the flying magneto-optical head employing the L-shaped slider body.

In still another preferred embodiment of the optical head 106, as shown in FIGS. 9 and 10, the mirror substrate 400 and mirror 401 are mounted on an L-shaped (as viewed from the side) slider body 422' rather than the optics mounting block 424 (of FIGS. 4–6). This reduces the length of optics mounting block 424' and allows the optics mounting block to be aligned as a unit with respect to the slider body 422'. A 150 micron air gap may be provided between the optics mounting block 424' and the L-shaped slider body 422' to allow for adjustment along the optical axis. Therefore, the divergent beam emerging from the optics mounting block 424' can be positioned with respect to the objective lens 446 along all three axes. The mirror substrate 400 and mirror 401 are mounted on a mirror mounting block 480 on the forward edge of the slider body 422'. The optics mounting block 424' and the slider body 422' may be joined using a filled epoxy.

The optics mounting blocks 424, 424' include various channels and recesses that are correspondingly shaped, dimensioned and positioned to accept the lens components 462, 466, 474, and 476, the leaky beam splitter 464, the compensator plate 468 or quarter-wave plate 468', the half-wave plate 470 and the polarizing beam splitter 472 in the aforementioned relationships. In a like manner, the optical fibers 110, 112, 102 are provided with corresponding channels and recesses in the optics blocks 424, 424' that are aligned and positioned as described. The optical elements 460 may be fixed in place in their respective channels and recesses by a suitable epoxy, adhesive, or solder.

The dimensions of the channels and recesses may be easily controlled to within a few microns. Provision may be also made for axially positioning the lens components. For example, for the imaging lens 466, a recess may be provided having a closely fitting channel width relative to the lens diameter to tightly position the lens 466 radially with respect to the optical axis, but may have a length to afford axial freedom to change the image of the end of the input fiber 102 on the mirror 401.

The size and spacing of the optical components are preferably such that the footprint of the flying MO head 106 over the disk 107 remains quite small. The optical components may be spaced quite closely, on the order of 100 microns to 400 microns, thus preserving the small footprint of the MO head 106. For example, a preferred embodiment of the MO head 106 includes a slider body 420 that is approximately 0.54 mm in height, 2.8 mm in length, and 2.2 mm in width, and includes an optics mounting block 424 that is approximately 0.40 mm in height, 2.2 mm in length, and 2.2 mm in width.

A preferred material for the optics mounting block 424 is silicon, as photolithographic processes are readily available for high precision definition of such component-receiving channels and recesses. The axial, angular and lateral tolerances for defining the channels and recesses are achievable with conventional silicon processing and will provide suitable positioning and alignment of the various optical components with minimal or no adjustment required.

The various collimating, imaging, objective and output focusing lens are preferably gradient index (GRIN) lenses. The collimating, imaging and output focusing lenses 462, 466, 474, and 476 may also be molded plastic lenses. The objective lens 446 may be a molded glass bi-asphere lens. For example, in a preferred embodiment, the gradient index (GRIN) lenses have a length of about 500 microns, a diameter of about 250 microns, a base index of about 1.643 and a gradient index constant of about 2.319 $mm^{-1}$. The leaky beam splitter 464 is preferably a BK-7 glass with a thickness of about 250 microns, a width of about 790 microns and a height of about 250 microns. The compensator plate 468 and quarter-wave plate 468' are preferably quartz with a thickness from about 90 microns, a width of about 480 microns, and a height of about 250 microns. The half-wave plate 470 is preferably quartz with a thickness of about 108 microns, a width of about 480 microns and a height of about 250 microns. The beam splitter 472 is preferably a glass substrate with a thickness of about 400 microns and dimensions of about 480 microns by 250 microns.

The linearly-polarized Fabry-Perot (FP) diode laser source 231 operates at an optical power that is sufficient for reading and writing to the MO disks 107. In a preferred embodiment, the laser diode source 231 is radio frequency (RF) modulated. A typical RF-modulated laser diode for this application may operate at a power of approximately 30–40 mw, at a wavelength of 650 nm +−2 nm, and with RF amplitude modulation at about 300–400 MHz. The unmodulated spectral bandwidth is about +−1 nm.

The single-mode optical fiber 102 is preferably a polarization maintaining (PM) or polarizing (PZ) optical fiber. The return optical fibers 110, 112 may be multi-mode fibers, since they carry only intensity information. The diameter of the three fibers 102, 110, 112 may be reduced to provide an equivalent mechanical load on the flying MO head 106 compared to the single fiber approach of the prior art As shown in FIG. 4, the objective lens 446 may be coupled to the slider body 420 generally within a vertical (relative to the horizontal disk) cutout 411 near a corner of the slider body 420. The vertical cutout 411 may also be located at other positions on the flying MO head 106, such as along a central axis of the slider body 420. Positioning the optical fiber 102 and the objective lens 446 at other than along a central axis may affect the center of mass of the magneto-optical head 106 and, thus, its flying characteristics. Accordingly, the location of the suspension gimbal attachment 426, which is the point at which the suspension 130 is connected to the MO head 106, may require adjustment to compensate for off-center changes in the center of mass of the magneto-optical head 106.

In a preferred embodiment of the present invention, the incident laser beam 191 traverses a one-way optical path to the surface recording layer 349 of the MO disk 107. This optical path includes the single-mode optical fiber 102, the collimating lens 462, the LBS 464, the imaging lens 466, the mirror 401, and the objective lens 446. The single-mode optical fiber 102 and the objective lens 446 are positioned within their respective cutouts to focus the incident laser beam 191 within the spot of interest 340. The mirror substrate 400 and optical elements 460 are preferably compact so as to fit within a physical volume approximating the rectangular volumetric dimensions of the slider body 420. However, these components should also be sufficiently large to direct a full cross section of the incident and reflected laser beams 191 and 194 so that minimal power is lost and significant distortion and aberrations in the incident and reflected laser beams 191 and 194 are not introduced.

Preferably, the mirror substrate 400 and mirror 401 are an electrically steerable micro-machined mirror assembly. Fine tracking and short seeks to a series of nearby tracks may be performed electrically by rotating the mirror 401 of the mirror substrate 400 about a rotation axis, thus changing the propagation angle of the incident laser beam 191 before transmission to the objective lens 446. The mirror 401 is rotated by applying a differential voltage to a set of drive electrodes. The differential voltage on the electrodes creates an electrostatic force that rotates the mirror 401 about a set of axial hinges, thus moving the focused optical spot in a radial direction on the MO disk 107. In a preferred embodiment, the mirror 401 is rotated approximately +−2 degrees or an equivalent track pitch of approximately +−4 tracks on the MO disk 107, in a direction 450 (FIG. 6) approximately parallel to the radial direction of the MO disk 107. Consequently, movement of the focused optical spot across the MO disk 107 and detection of the reflected laser beam 194 may be used for recording and reading information, track following, and seeks from one data track to another. Coarse tracking is performed by adjusting the current to the rotary actuator magnet and coil assembly 120.

The track following signals used to follow a particular track of the MO disk 107 may be derived using well known fine and coarse tracking servo techniques. For example, a sampled sector servo format may be used to define tracks. The servo format may include either embossed pits stamped into the MO disk 107 or magnetic domain orientations that are read similar to data marks. Conventional Winchester magnetic disk drives rely on a set of suspensions and actuator arms that move in tandem as one integral unit across the multiple disks. Because each flying head of such an integral unit is fixed relative to another flying head, simultaneous track following is not possible. In contrast, the steerable micro-machined mirror assembly of the present invention allows simultaneous track following, as well as seeks for recording and reading information, on more than one disk surface at any given time irrespective of the movement of the set of actuator arms 105 and set of suspensions 130. Independent track following and seeks using a set of concurrently operating reflective surface portions 401 requires separate read channels and fine track electronics and mirror driving electronics. Therefore, separate laser-optics assemblies 101 would be required, potentially eliminating the need for the optical switch 104.

While the foregoing has described preferred embodiments of the invention, it is to be understood that the description is illustrative only and that changes in these embodiments may be made without departing from the principles of the invention, the scope of which is defined only by the claims as set forth below. It will be appreciated, for example, that it would be possible to modify the sizes, shapes and types of the various elements disclosed, and to include or exclude other elements. More than one mirror could be used to direct incident and reflected light beams, and alternate beam splitters and other polarizing components may be employed that may be quite different from those described.

We claim:

1. A flying magneto optical (MO) head for directing a light beam using a component disposed between a magneto-optical data storage medium and a source, the optical head comprising an optics mounting block for mounting optic components thereon; and a slider body whereon the optics block is mounted for supporting the optics mounting block over a magneto-optical (MO) storage medium.

2. The flying optical head as set forth in claim 1 further comprising a plurality of optical elements carried on said optics mounting block and slider body for directing an incident light beam to the MO storage medium and for optically processing a reflected light beam from the MO storage medium, the reflected light beam having rotated polarilization states representative of information recorded on the MO storage medium.

3. The flying optical head as set forth in claim 2, wherein said optical elements comprise an optical fiber for optically coupling a linearly polarized incident light beam onto the optics mounting block.

4. The flying optical head as set forth in claim 3, wherein the optical fiber is a single-mode optical fiber selected from one of a polarization maintaining optical fiber and a polarizing optical fiber.

5. The flying optical head as set forth in claim 1, wherein the optics mounting block has channels formed therein for receiving optical components.

6. The flying head of claim 5, wherein the slider body is L-shaped, having a projecting edge portion on an upper surface thereof on the end of the slider body, and wherein the optics mounting block is supported on said upper surface in engagement with said projecting edge portion.

7. A flying magneto optical (MO) head for directing a light beam using a component disposed between a magneto-optical data storage medium and a source, the optical head comprising an optics mounting block for mounting optic components;
    a slider body for supporting the optics mounting block over a magneto-optical (MO) storage medium; and
    a plurality of optical elements carried on said optics mounting block and slider body for directing an incident light beam to the MO storage medium and for optically processing a reflected light beam from the MO storage medium, the reflected light beam having rotated polarization states representative of information recorded on the MO storage medium;
    wherein said optical elements comprise an optical fiber for optically coupling a linearly polarized incident light beam onto the optics mounting block; wherein the optical fiber is a single-mode optical fiber selected from one of a polarization maintaining optical fiber and a polarizing optical fiber; and wherein the optical elements comprise means for transmitting a first incident component of the linearly polarized incident light beam and for reflecting a second incident component of the incident light beam; a mirror for reflecting the transmitted component of the incident light beam; means for focusing the reflected transmitted component of the incident light beam to a spot on the MO storage medium, the light beam being reflected by the MO storage medium and the mirror to produce reflected light beam; means for rotating the polarization of the reflected light beam from the MO storage medium; and means for splitting the reflected light beam into first and second polarization components representing information recorded on the MO storage medium.

8. The flying optical head as set forth in claim 7, wherein the mirror is a steerable micro-machined mirror assembly.

9. The flying optical head as set forth in claim 8, wherein the mirror is electrically steerable to direct the instant light beam to adjacent tracks on the MO storage medium.

10. The flying optical head as set forth in claim 7, wherein the slider body is shaped to enable the mirror to be mounted on the slider body and positioned to intercept the incident and reflected light beams.

11. The flying optical head as set forth in claim 10, wherein the slider body has a first surface upon which the optics mounting block is carried, and a second surface angled with respect to the first surface and positioned adjacent the optics mounting block, the mirror being carried on said second angled surface.

12. The flying optical head as set forth in claim 10, wherein said mirror assembly comprises a mirror substrate carrying a gimballed electrically steerable reflector thereon, the mirror substrate being mounted on the slider body with the reflector positioned to intercept said light beams.

13. The flying optical head as set forth in claim 10, wherein the remote optics assembly further includes a diode laser source for generating the linearly polarized incident light beam.

14. The flying optical head as set forth in claim 7, wherein the optical elements comprise first and second return optical fibers for optically coupling the first and second polarization components of the reflected light beam to an optics assembly remote from the optical head.

15. The flying optical head as set forth in claim 14, wherein the remote optics assembly includes first means for converting the polarization components of the reflected light beam into corresponding electrical signals, and second means for converting the electrical signals into a resultant output signal representing the information recorded on the MO storage medium.

16. A flying magneto-optical head for use in a magneto-optical data storage system, comprising a slider adapted to fly over the surface of the magneto-optical data storage system, a mounting block for mounting optical components thereon, the slider having grooves in a surface thereof for receiving optical components mounted on the mounting block for directing a light beam to the magneto-optical data storage medium and for receiving a light beam reflected from the magneto-optical data storage medium.

17. The flying magneto-optical head of claim 16 further comprising a plurality of optical elements mounted in said grooves for processing the light beams.

18. The flying magneto-optical head as set forth in claim 17, wherein the optical elements comprise means for transmitting a first incident component of the linearly polarized incident light beam and for reflecting a second incident component of the incident light beam; a mirror for reflecting the transmitted component of the incident light beam; means for focusing the reflected transmitted component of the incident light beam to a spot on the MO storage medium; means for rotating the polarization of a reflected light beam from the MO storage medium; and means for splitting the reflected light beam into first and second polarization components containing the information recorded on the MO storage medium.

19. A flying magneto-optical head for use in a magneto-optical data storage system, comprising a slider adapted to fly over the surface of the magneto-optical data storage system, the slider having grooves in a surface thereof for receiving optical components for directing a light beam to the magneto-optical data storage medium and for receiving a light beam reflected from the magneto-optical data storage medium, and a plurality of optical elements mounted in said grooves for processing the light beams, wherein the optical elements comprise a leaky beam splitter for receiving the linearly polarized incident light, and for transmitting a first incident component and reflecting a second incident component of the incident light beam; a mirror for reflecting the transmitted component of the incident light beam; an objective lens for focusing the reflected transmitted component onto a spot on the MO storage medium; a half-wave plate for rotating the polarization of a reflected light beam from the MO storage medium; and a polarization beam splitter for splitting the reflected light beam into first and second polarization components.

20. The flying magneto-optical head as set forth in claim 19 further comprising optical fibers for optically coupling the polarization components of the reflected light beam to a remote optics assembly.

* * * * *